(12) United States Patent
Rincoe

(10) Patent No.: US 7,025,332 B2
(45) Date of Patent: Apr. 11, 2006

(54) MECHANICAL ARM ASSEMBLY AND METHOD THEREFOR

(75) Inventor: Richard G. Rincoe, Golden, CO (US)

(73) Assignee: RV Safety Products, LLC, Lakewood, CO (US)

( * ) Notice: Subject to any disclaimer, the term of this patent is extended or adjusted under 35 U.S.C. 154(b) by 159 days.

(21) Appl. No.: 10/699,243

(22) Filed: Oct. 30, 2003

(65) Prior Publication Data
US 2005/0189528 A1   Sep. 1, 2005

(51) Int. Cl.
*B66F 3/00* (2006.01)
(52) U.S. Cl. ............... 254/126; 254/419; 254/420; 254/425
(58) Field of Classification Search ............... 254/126, 254/419, 420, 425
See application file for complete search history.

(56) References Cited

U.S. PATENT DOCUMENTS 1,399,736 A * 12/1921 Benjamins ............... 254/126

* cited by examiner

*Primary Examiner*—Robert C. Watson
(74) *Attorney, Agent, or Firm*—Timothy J. Martin; Michael R. Henson

(57) ABSTRACT

A mechanical arm includes a base that mount on a selected support. A proximal arm member has a proximal end portion pivotally secured to the base and a distal end portion pivotally secured to a distal arm member. The base has a first fixed gear element disposed thereon, and a second fixed gear element is disposed on the distal arm member. A drive shaft is rotatably disposed on the proximal arm member and includes a first end portion provided with a first drive gear engaging the first fixed gear element and a second drive gear provided with a second drive gear engaging the second fixed gear element such that rotation of the drive shaft acts to pivot the arm members. A drive acts to rotate the drive shaft.

42 Claims, 4 Drawing Sheets

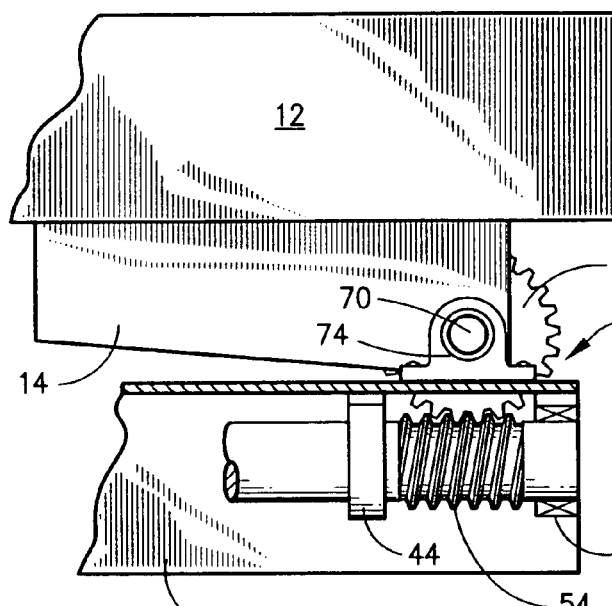
Fig.8
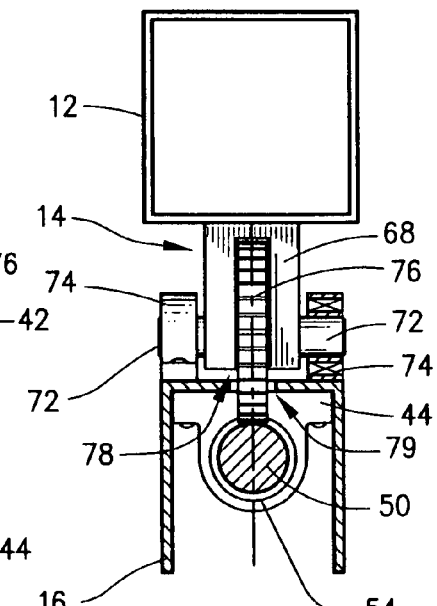
Fig.9
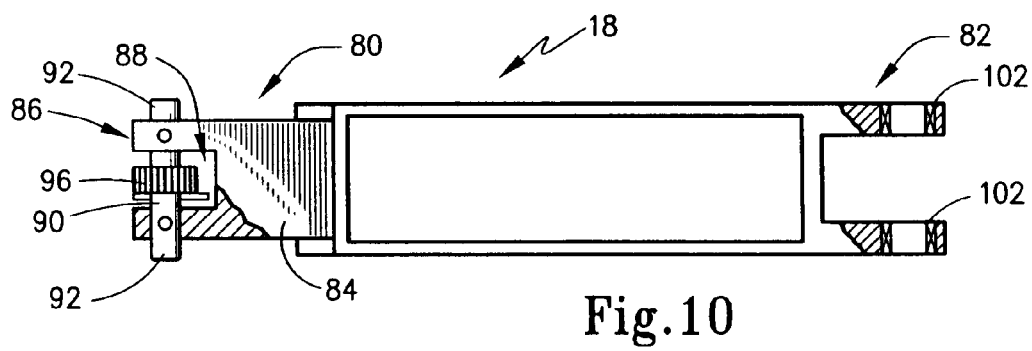
Fig.10
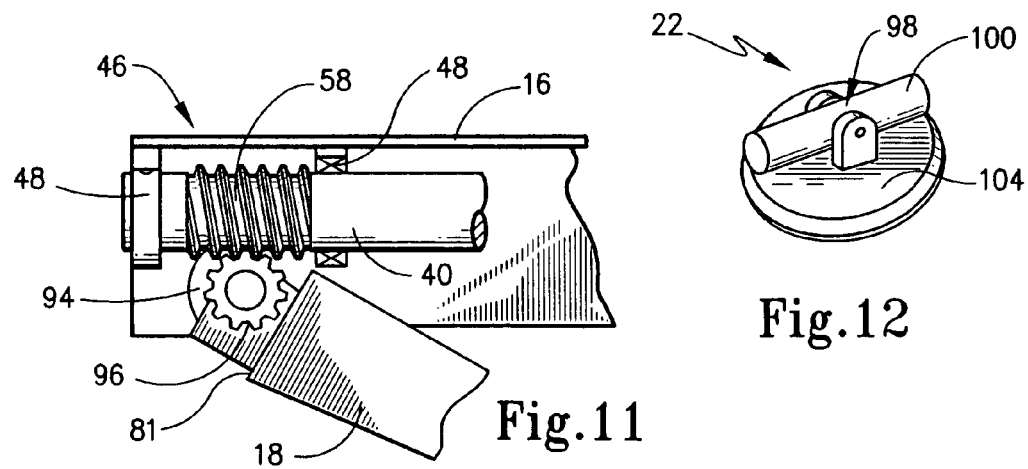
Fig.11
Fig.12

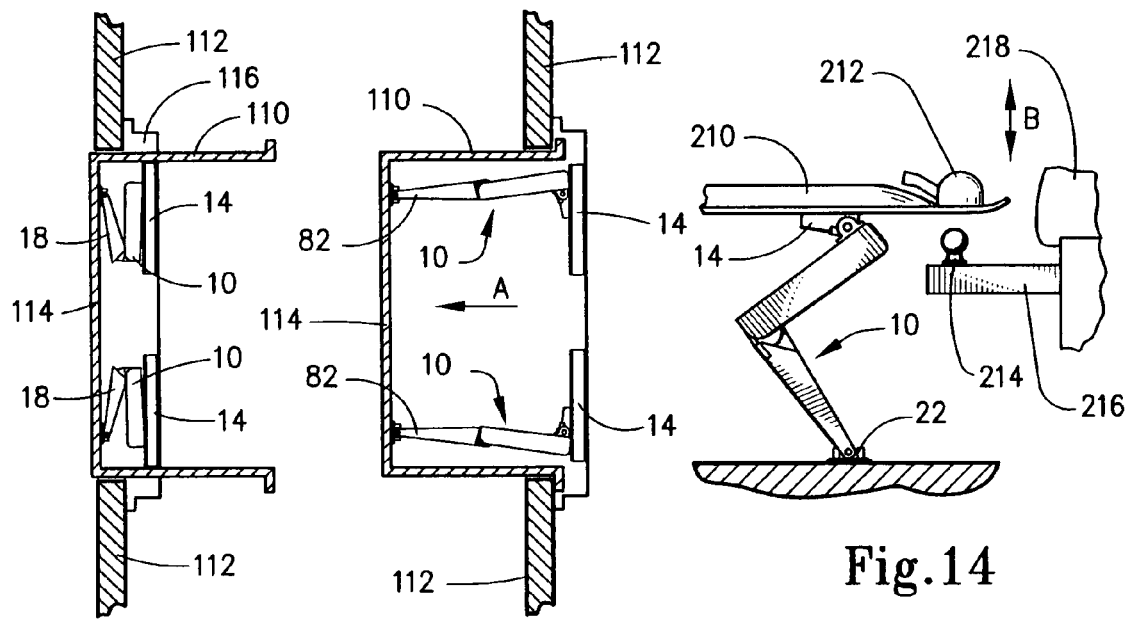
Fig.13a  Fig.13b  Fig.14
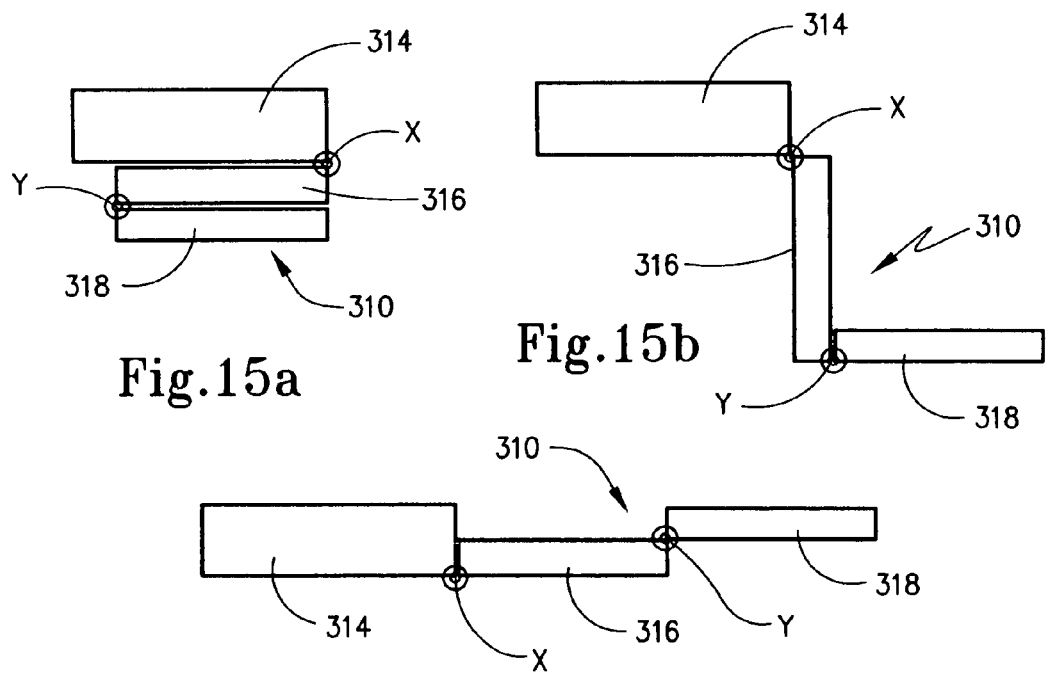
Fig.15a  Fig.15b
Fig.15c

MECHANICAL ARM ASSEMBLY AND METHOD THEREFOR

FIELD OF THE INVENTION

The present invention broadly relates to a mechanical lifting and positioning apparatus. More specifically, the invention is directed to a mechanical arm that can move between and extended and a contracted state. The invention particularly concerns a mechanical arm that can be used to apply a force between two objects or to position one object relative to another.

BACKGROUND OF THE INVENTION

A wide variety of different mechanical devices have been developed in order to apply force between two objects or to position one object relative to another. For example, numerous types of jacks are known in the art, and numerous types of robotic arms have been developed for particular applications in industry.

With respect to mechanical jacks, it is well known that jacks can be used to elevate one object relative to another or to apply a force between two objects. Mechanical jacks typically come in three types: lever operated jacks, screw operated jacks and hydraulic jacks. A lever jack uses the principle of a small force over a large distance to elevate a heavy load over a small distance. Ratchets are often provided so the mechanical advantage of the lever may be sequentially applied to elevate the load a desired amount within the jacks throw distance. Screw jacks on the other hand, gain a mechanical advantage by use of a thread wherein rotary movement advances the screw to move the load. Hydraulic jacks implement the advantage of a pressurized fluid to move an extendable support member.

Robotic arms are known to incorporate a variety of mechanisms. For example, some robotic arms merely pivot about an axis so that a distal end of the arm moves from one location to another to accomplish a desired task. It is known to construct arms that employ a scissor action so that the arm may move between A collapsed state and an extended state. Some arms may use telescoping pieces to move between extended and contracted states. Other robotic arms may use an lever action wherein one end of the lever is mechanically driven so as to manipulate the opposite lever end.

One industry that employs a variety of different force applying structures is the recreational vehicle industry. For example, it is known the recreational vehicle industry to use mechanical jacks to raise and lower the tongue of a trailer. It is also known to use mechanical jacks at various locations on the undercarriage of the vehicle so as to stabilize and/or level the vehicle when it is parked. Typical jacks used in this application include all three types discussed above. It is also known to provide recreational vehicles with sliding compartments to increase the useable space within the vehicle when it is to be inhabited.

Despite the existence of various mechanical arms and mechanical jacks, there remains a need for improved mechanical arms which may function either to apply force between two objects or to position one object with respect to another. A need exists for simplified, reliable mechanical arms that can serve these needs. There is further need for such mechanical arms that have a high strength to weight ratio. A further need exists for such mechanical arms to collapse within a small dimension yet expand over a significant range. The present invention is directed to meeting these needs.

OBJECTS OF THE INVENTION

It is an object of the present invention to provide a new and useful mechanical arm that may be used to apply force between objects or to extend one object relative to another.

It is another object of the present invention to provide a new and useful method of providing a maneuvering mechanical arm assembly.

A further object of the present invention is to provide a mechanical arm that is simple in construction and durable during use.

Another object of the present invention is to provide a mechanical arm that can function as a mechanical jack or as a mechanical extender.

Still a further object of the present invention is to provide a mechanical arm that operates on low power yet which has a significant force capability.

According to the present invention, then, a mechanical arm is provided that is adapted to mount to a support and is operative to move from a contracted state to an extended state. Broadly, this mechanical arm includes a base that is adapted to secure to the support with the base having a first fixed gear element disposed thereon. An elongated distal arm member is also included, and the distal arm member has a first end portion and a second end portion opposite the first end portion. The distal arm member includes a second fixed gear element disposed thereon. An elongated proximal arm member then interconnects the base and elongated distal arm member. Here, the proximal arm member has a proximal end portion pivotally secured to the base for movement about a first pivot axis and a distal end portion pivotally secured to the distal arm member so that the distal arm member can pivotally move relative to the distal end portion of the proximal arm for movement about a second pivot axis. A drive shaft is then rotatably disposed on the proximal arm member and extends longitudinally thereof. The drive shaft includes a first end portion provided with a first drive gear engaging the first fixed gear element and a second end portion opposite the first end portion that is provided with a second drive gear that engages the second fixed gear element. Rotation of the drive shaft rotates the first and second drive gears thereby to act respectively on the first and second fixed gear elements so as to pivot the proximate arm relative to the base and to pivot the fixed arm member relative to the proximal arm member. A drive is then associated with the drive shaft for selectively rotating the drive shaft relative to the proximal arm member.

In the disclosed embodiment, the base includes a first axle formed thereon to define the first pivot axis. The proximal end portion of the proximal arm member includes at least one fixed bearing member sized and adapted to receive the first axle for pivotal movement thereon. Here, the base may include a first knuckle having a first gap therein, and the first axle is defined by a first axle pin passing through the first knuckle to form oppositely projecting first trunnions. The proximal end portion of the proximal arm member then includes a pair of first bearing members sized and adapted to received the first trunnions for pivotal movement thereon. The first fixed gear element can be mounted to the first axle pin and is located in the first gap of the first knuckle.

Similarly, the distal arm member can include a second axle formed thereon to define a second pivot axis with the distal end portion of the proximal arm member including at least one second bearing member sized and adapted to receive the second axle for pivotal movement thereon. The distal arm member can include a second knuckle having a second gap therein with the second axle being defined by a second axle pin passing through the second knuckle to form oppositely projecting second trunnions. The proximal end portion to the proximal arm member then includes a pair of second bearing members sized and adapted to receive the second trunnions for pivotal movement thereon. The second fixed gear element can be mounted to the second axle pin and located within the second gap of the second knuckle. Here, also, the second axle may be disposed on the fixed end portion of the distal arm member.

In the disclosed embodiment, the proximal arm member is constructed as a channel piece that includes a pair of sidewalls and a connecting wall extending therebetween to define and interior region. The connecting wall has a slot formed therein at the proximal end portion with the slot sized and adapted to allow the first fixed gear element to extend therethrough. The drive shaft is then located in the interior region of the channel piece. The first and second drive gears on the drive shaft may be worm gears, such as cone drive double enveloping worm gears.

The drive can include an output shaft provided with an output gear. The drive shaft can have a central portion that includes a transfer gear disposed thereon for engaging the output gear. The drive is then mounted to the proximal arm, and the output shaft can extend transversely of the proximal arm through the interior region so that the output gear can engage the transfer gear on the drive shaft. In the disclosed embodiment, the drive is an electric motor which may include a reduction gearbox associated therewith.

If desired, a foot member may be disposed on the second end portion of the distal arm member and the foot may be connected to the second end portion of the distal arm member by a gimbal mount. The first end of the distal arm member can have a dog that provides a mechanical stop when in the extended state. This dog also provides a support ledge so that, when fully extended and under a mechanical load, some torque force on the gears is reduced.

As disclosed in the application, the ratios of the first and second fixed gear elements, the first and second drive gear and the first and second drive gears may be selected to have varying mechanical actions during the contraction and extension of the mechanical arm. While the gear ratio can be one to one so that the proximal arm member pivots 180 degrees relative to the base with the distal arm portion pivoting 180 degrees relative to the proximal arm member, in one embodiment, the ratio of the gears is selected so that the distal arm member undergoes about twice the amount of angular movement about the second pivot axis when compared with the amount of angular movement of the proximal arm member about the first pivot axis. In this manner, the second end portion of the distal arm member (which can include a foot) moves in a relatively linear manner where the proximal and distal arm members have a common length.

The present invention is also directed to a method of providing and maneuvering a mechanical arm assembly relative to a base port. This method can include any of the procedural steps inherent in the above-described structure. More particularly, the method includes the step of pivotally attaching the proximal end portion of a first arm member to the base support whereby the first arm member may pivot about a first pivot axis relative to the base support. The method includes the step of pivotally attaching a proximal end portion of a second arm member to a distal end portion of a first arm member whereby the second arm member may pivot about a second pivot axis relative to the first arm member. The method may include the step of mechanically driving the first arm member about the first pivot axis or a first angular range and simultaneously mechanically driving the second arm member about the second pivot axis over a second angular range wherein the second angular range is about twice the first angular range.

These and other objects of the present invention will become more readily appreciated and understood from a consideration of the following detailed description of the exemplary embodiments of the present invention when taken together with the accompanying drawings, in which:

BRIEF DESCRIPTION OF THE DRAWINGS

FIG. 8 is a side view in elevation and partial cross-section enlarged to show the connection of the proximal end portion of the proximal arm member to the base according to the present invention;

FIG. 9 is an end view in elevation and in partial cross-section of the connection of the proximal end portion of the proximal arm member to the base, as illustrated in FIG. 8;

FIG. 10 is a top view in partial cross-section showing the distal arm member used with the mechanical arm of FIG. 1;

FIG. 11 is a side view in partial cross-section showing the interconnection of the first end portion of the distal arm member to the distal end portion to the proximal arm member according to the present invention;

FIG. 12 is a perspective view of a gimble foot used with the mechanical arm according to the present invention;

FIG. 13(a) and FIG. 13(b) show a diagrammatic top view in cross-section representing the use of a pair of mechanical arms according to the present invention to extend and retract an extendable compartment for example, in a recreational vehicle;

FIG. 14 is a side view in elevation showing the use of a mechanical arm according to the present invention as the mechanical jack on the tongue of a trailer vehicle;

FIGS. 15(a), 15(b) and 15(c) are diagrammatic representations showing a mechanical arm according to the present invention utilizing different gear ratios so that the proximal arm member and the distal arm member undergo substantially equal angular rotations about their respective axis.

DETAILED DESCRIPTION OF THE EXEMPLARY EMBODIMENTS

The present invention generally concerns mechanical arms that may be used to apply force between two objects or to extend one object relative to one another. The invention also generally concerns methods of providing and maneuvering a mechanical arm assembly relative to a base support. As described herein, the mechanical arm is described as a mechanical jack and is also illustrated as an extension arm which may be used to slide a room extender or other compartment in an RV vehicle. However, it should be understood that these descriptions are for explanatory purposes only and are in no way intended to limit the applications of the mechanical arm of the present invention. Indeed, the mechanical arm of the present invention may be used in a wide variety of applications where force needs to be applied between two objects or when one object needs to be extended relative to another.

Figure 1:
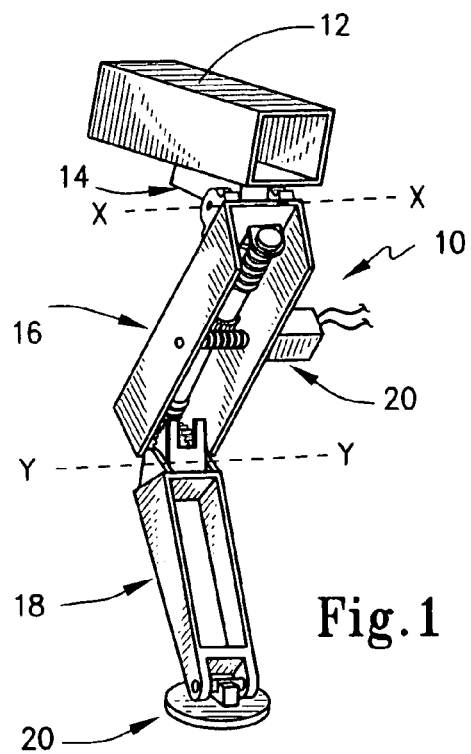
FIG. 1 is a perspective view of a mechanical arm according to the exemplary embodiment of the present invention mounted to a support and shown in an intermediate state between an contracted state and an extended state.

With this generality in mind, reference is first made to FIG. 1 which illustrates the illustrated mechanical arm 10 mounted to a support 12 which is here illustrated to be a square tubular member such as might be found on the frame of a vehicle or other structure. Mechanical arm 10 is shown to include a base 14 that is adapted to secure to support 12, an elongated proximal arm member 16 that has a proximal end portion pivotally secured to the base for movement about a first pivot axis "X", and an elongated distal arm member 18 that is pivotally attached to proximal arm member 16 for pivotal motion about a second pivot axis "Y". Proximal and distal arm members 16 and 18 are shown to be a substantially common length. A motorized drive 20 is provided to move mechanical arm 10 from a contracted state to an extended state. A foot in the form of a pad 22 is also located at the distal end of mechanical arm 10 corresponding to the distal end of distal arm member 18.

Figure 2A:
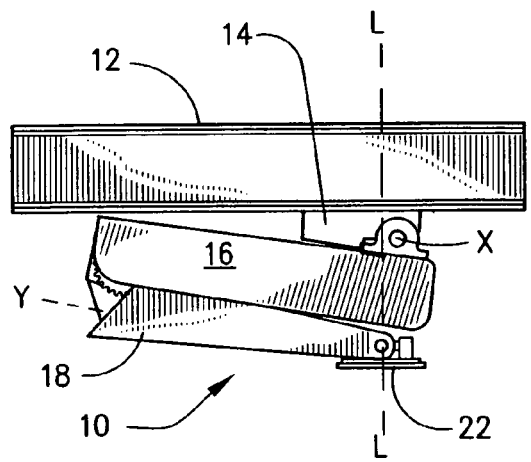
FIG. 2(a) is a side view in elevation of the mechanical arm of FIG. 1 shown in a contracted state.
Figure 2B:
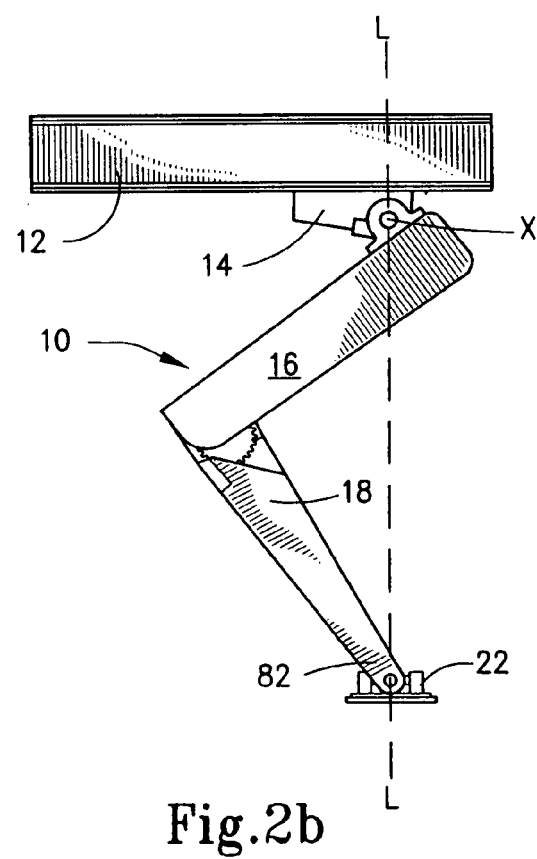
FIG. 2(b) is a side view in elevation of the mechanical arm of FIG. 1 is an intermediate state.
Figure 2C:
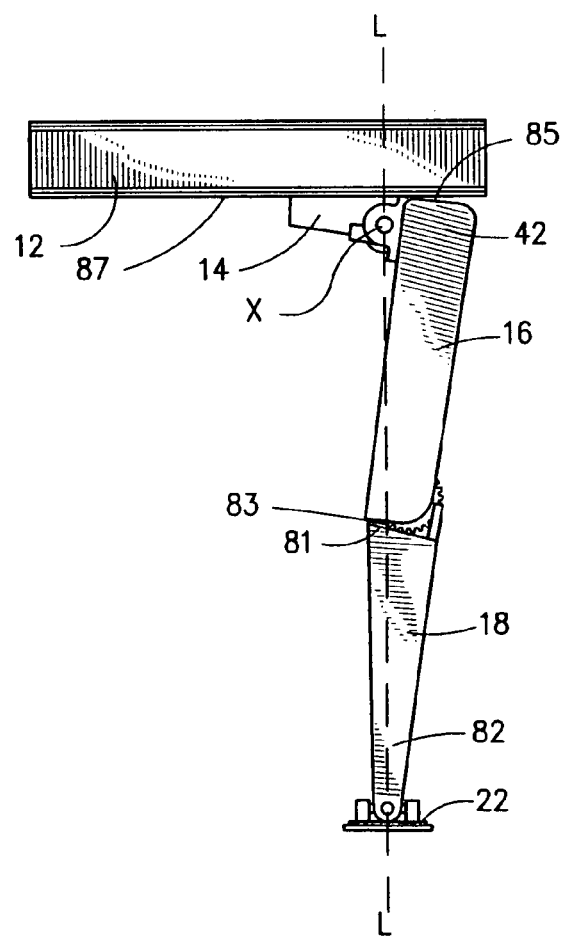
FIG. 2(c) is a side view in elevation of the mechanical arm in an extended state.
Figure 3:
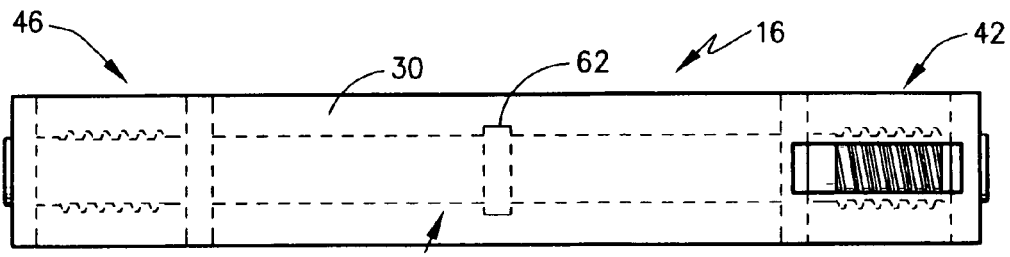
FIG. 3 is a top plan view of the proximal arm member used with the mechanical arm of FIG. 1.

As noted, mechanical arm 10 is operative to move between a contracted state and an extended state, and this motion according to the first exemplary embodiment of the present invention is illustrated in FIGS. 2(a)–2(c). In FIG. 2(a), it may be seen that mechanical arm 10 is in a fully contracted state and is moveable through an intermediate state shown in FIG. 2(b) to a fully extended state shown in FIG. 2(c). During this motion, and for reasons described more thoroughly below, it may be seen that foot pad 22 moves relatively linearly along a line "L" that is generally perpendicular to support 12.

The structure of mechanical arm 10 can be more fully appreciated with continued reference to FIG. 1 but with specific reference to FIG. 3–12 which illustrates the components used to construct mechanical arm 10. With reference first to FIGS. 3–7, it may be seen that proximal arm member 16 is constructed as a channel piece 30 including a pair of sidewalls 32 and 33 that are interconnected by a connecting wall 34 that forms a bottom for channel piece 30. Thus, channel piece 30 has an interior region 36. A drive shaft 40 is located in interior region 36 and extends longitudinally for the length thereof.

Figure 4:
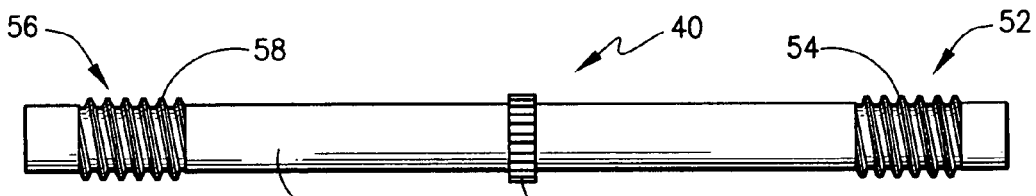
FIG. 4 is a side view in elevation of a drive shaft used in conjunction with the proximal arm of FIG. 3.
Figure 5:
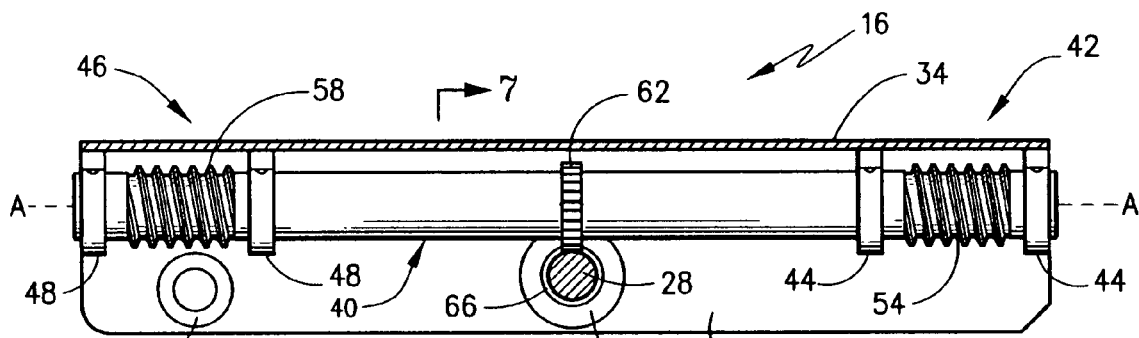
FIG. 5 is a side view in partial cross-section of the proximal arm member shown in FIG. 3 with the drive shaft of FIG. 4 positioned therein.

As is shown in FIG. 4, drive shaft 40 is constructed with as an elongated cylindrical bar 50 that has a first end portion 52 provided with a first drive gear 54, a second end portion 56 provided with a second drive gear 58, and a central portion 60 of drive shaft 40 includes a transfer gear 62. As is shown in FIG. 5, first drive gear 54 is positioned between the pair of bearings 44, and second drive gear 58 is positioned between the pair of second bearings 48. The mounting of drive shaft 40, in channel piece 30, is best illustrated in FIG. 5. Here it may be seen that drive shaft 40 is rotatably journaled on proximal arm member 16 so that it may rotate about an axis "A". To this end, as is best shown in FIG. 5, a first pair of bearings 44 are mounted in the interior region 36 at proximal end portion 42 at proximal arm member 16. Similarly, a second pair of bearings 48 are mounted in the interior region 36 at distal end portions 46 of proximal arm member 16.

Figures 6, 7:
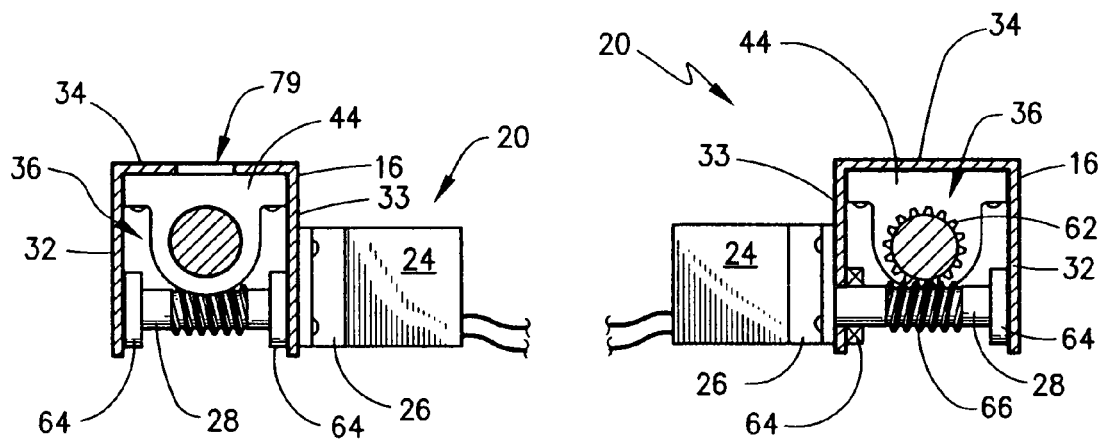
FIG. 6 is a right end view in elevation of the proximal arm member shown in FIG. 5.
FIG. 7 is a cross-sectional view taken about lines 7—7 of FIG. 5.

Motorized drive is best illustrated in FIGS. 5–7 and it should be appreciated that motorized drive 20 includes a reversible drive electrical motor 24 and a gear box 26 of known construction so that an output shaft 28 of motorized drive 20 is rotated at a desired rate of speed. The speed and power of motor 24 along with the gearing of gear box 26 (which may be a reduction gear box) determines the force that can be applied by mechanical arm 10 and the speed with which it extends and contracts. As is shown in these figures, output shaft 28 is rotatably journaled between a pair of bearings 64, and output shaft 28 carries an output gear 66. Drive shaft 40, along with its transfer gear 62 and output shaft 28 with its output gear 66 are situated so that output gear 66 engages transfer gear 62 so that rotation of output shaft 28 causes a rotation of drive shaft 40 about axis "A". This, in turn, acts to rotate first and second drive gears 54, 58 which, as illustrated are worm gears. More specifically, first and second drive gears 54 and 58 may be cone drive double enveloping worm gears of a type known in the art.

With reference next to FIGS. 8 and 9, it may be seen that proximal end portion 42 of proximal arm member 16 is pivotally secured to base 14. To this end, base 14 includes a first knuckle 68 that receives an axle pin 70 to form oppositely projecting trunnions 72. Trunnions 72 are rotatably journaled between a pair of opposed pillow blocks 74 that are mounted on proximal end portion 42 of proximal arm member 16. A first fixed gear element 76 is mounted on axle pin 70 and is located in a gap 78 formed by knuckle 68. It should be understood that first fixed gear element 76 does not rotate with respect to base 14. Moreover, first fixed gear element 76 may be affixed to knuckle 68 and provided with a bearing so that axle pin 70 can be rotatable therein with axle pin 70 then being rigidly affixed to proximal arm member 16. Proximal arm member and proximal end portion 42 of proximal arm member 16 should be freely pivotal about axis "X" with gear element 76 being fixed with respect to base 14.

As is shown in FIGS. 8 and 9, first drive gear 54 engages first fixed gear element 76. To this end, proximal end portion 42 of proximal arm 16 has a slot 79 formed in connecting wall 34. This permits first fixed gear element 76 to engage drive gear 54. When drive gear 54 is rotated, it moves around the circumference of first fixed gear element 76 so as to pivot proximal arm member 16 between the contracted and expanded states. Accordingly, it should be understood that an angular rotation of approximately 90 degrees only requires that fixed gear element 76 have approximately 90-degree extension of gear teeth.

The structure of distal arm member 18 may be more fully appreciated with reference to FIGS. 10 and 11. Here, distal arm member 18 is shown to be a rigid piece having a first end portion 80 and a second end portion 82 opposite first end portion 80. A block 84 is located at first end portion 80 and includes a dog 81 forming a support ledge. Block 84 carries a second knuckle 86 having a gap 88 formed therein. A second axle is formed by axle pin 90 which forms oppositely projecting trunnions 92 that are received in a pair of bearings, such as bearing 94 mounted to distal end portion 46 of proximal arm member 16. A second fixed gear element 96 is rigidly affixed relative to distal arm member 18 on axle pin 90 and is located within gap 88. With reference to FIG. 11, it should now be understood that the second axle formed by axle pin 90 is received in bearings 94 and is located so that second fixed gear element 96 engages second drive gear 58 on drive shaft 40.

In operation, the rotation of drive shaft 40, and thus second drive gear 58, causes relative pivotal movement of distal arm member 18 at the distal end portion 46 of proximal arm member 16. Again, it is important that second fixed gear element 96 be rigidly affixed relative to distal arm member 18 and that various constructions are possible. In FIG. 10, it may be seen that second fixed gear element is received on axle pin 90 and may be affixed thereto by keying or otherwise and axle pin 90 is correspondly affixed within knuckle 86. Further, it should be understood that the amount of pivotal movement of distal arm member 18 relative to the distal end portion 46 of proximal arm member 16 is determined by the pitch and size of the various gears. When in the extended state, dog 81 can abut edge 83 of channel piece 30 (FIG. 2(c)). In the extended state and while a load is applied, this engagement helps reduce torque on the gears. The abutment of end edge 85 of proximal arm member 16 with edge 87 of support 12 also helps relieve these torque forces.

If desired for a particular application, a foot member such as footpad 22 may be disposed on the second end portion 82 of distal arm member 18. With reference to FIGS. 10 and 12, it may be seen that footpad 22 includes a gimbal mount 98 that includes a cross pin 100 that is received by a pair of bearings 102 of a yoke formed at the second end portion 82 of distal arm member 18. As is known, a gimbal mount, such as gimbal mount 98 allows rotation of foot portion 104 about 2 perpendicular axis.

With reference again to FIGS. 2(a)–2(c), it should now be appreciated that to accomplish the movement between the contracted state and the extended state illustrated therein, that the ratio of the first and second fixed gear elements and the first and second drive gears be selected such that the distal arm member 18 undergoes about twice an amount of angular movement about the second pivot axis "Y" when compared to the amount of angular movement of the proximal arm member 16 about the first pivot axis "X". This 2:1 ratio of gearing causes proximal arm member 16 to pivot approximately 90 degrees relative to support 12 until edge 85 of proximal end portion 42 abuts edge 87 of support 12 as is shown in FIG. 2(c) with dog 81 engaging edge 83. During this motion, distal arm member 18 pivots approximately 180 degrees about axis "Y" so that it forms a linear extension of proximal arm member 16 as is shown in FIG. 2(c). Moreover, by having proximal arm member 16 and distal arm member 18 of approximately the same length, second end portion 82 of distal arm member 18 moves linearly along line "L" so that the force applied by mechanical arm 10 may be orthogonal to the axis of base 14 and support 12. This, of course, has particular advantages where mechanical arm 10 is being used as a jack or as a member to extend two objects relative to each other.

For example, as is illustrated in FIGS. 13(a) and 13(b) in these figures, a pair of mechanical arms 10 are illustrated in diagrammatic form for use in moving a compartment or bay 110 relative to a wall 112, for example, as might be found in an extension room of an RV vehicle. In FIG. 13(a) it may be seen that mechanical arms 10 are in a contracted state so that bay wall 114 is somewhat flush with wall 112. Base 14 of mechanical arm 10 is connected a frame portion 116 of the recreational vehicle. The opposite or distal ends of distal arm member 18 of each mechanical arm 10 are coupled to bay wall 114. When mechanical arm 10 move to the extended state, as is shown in FIG. 13(b), movable compartment or bay 110 is pushed outwardly with respect to wall 112 in the direction of arrow "A". Reversal of the drive motor moves mechanical arms 10 toward the contracted state which withdraws bay 110 back to the position shown in FIG. 13(a) since the distal end 82 of distal arm members are linked to bay wall 114. Thus, it should be appreciated that in this application, it is important that distal end portions 82 move linearly in a direction generally perpendicular to frame portion 116.

With reference to FIG. 14, mechanical arm 10 is shown as a mechanical jack used to elevate the tongue 210 of a trailer. Here, base 14 is secured to tongue 210 with foot 22 engaging the ground or other surface. Contraction of mechanical arm 10 would lower hitch ball receiver 212 onto a hitch ball 214 of hitch 216 found on a towing vehicle 218. Naturally, extension of the mechanical arm 10 when the hitch ball is mated with the hitch ball receiver would disconnect the trailer from the towing vehicle 218. Thus, mechanical arm 10 assists in the coupling and uncoupling of the trailer tongue and acts to support the tongue when the trailer is uncoupled.

FIGS. 15(a)–15(c) show a diagram of another embodiment of the present invention that has a structure as described above but that has a different gearing ration. Here, a proximal arm member 316 that is pivotally secured to a base 314 wherein the ratio of the gears is 1 to 1. By this it is meant that proximal arm member 316 will pivot about axis "X" an equivalent angular amount as proximal arm member 316 and distal arm member 318 pivot with respect to one another about axis "Y". Thus, as is shown in FIG. 15(a), mechanical arm 310 is in the contracted state. Rotation of the drive shaft (not shown) will result in mechanical arm 310 moving to an intermediate position shown in FIG. 15(b) wherein proximal arm member 316 has pivoted 90 degrees with respect to base 314 while distal arm member 318 has pivoted 90 degrees with respect to proximal arm member 316. Continued rotation of the drive shaft to the position shown in FIG. 15(c) results in proximal arm member 316 rotating a full 180 degrees about axis "X" with distal arm member rotating 180 degrees about axis "Y".

From the foregoing it should also be appreciated that the present invention is directed to a method of providing and maneuvering a mechanical arm assembly relative to a base support. To this end, it should be explicitly understood that the method can include any step that is inherent in the above-described structure. Generally, a method according to the present invention includes a first step of pivotally attaching a proximal end portion of a first arm member to a base support whereby the first arm member may pivot about a first pivot axis relative to the base support. The method includes the step of pivotally attaching a proximal end portion of a second arm member to a distal end portion of the first arm member whereby the second arm member may pivot about a second pivot axis relative to a first arm member. The method then includes the step of mechanically driving the first arm member about the first pivot axis over a first angular range while simultaneously mechanically driving the second arm member about the second pivot axis over a second angular range that is about twice the first angular range.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A mechanical arm adapted to mount to a support and operative to move from a contracted state to an extended state, comprising:
   (A) a base adapted to secure to the support and including a first fixed gear element disposed thereon;
   (B) an elongated distal arm member having a first end portion and a second end portion opposite the first end portion and including a second fixed gear element disposed thereon;
   (C) an elongated proximal arm member having a proximal end portion pivotally secured to said base for movement about a first pivot axis and a distal end portion pivotally secured to said distal arm member for movement about a second pivot axis;
   (D) a drive shaft rotatably disposed on said proximal arm member and extending longitudinally thereof, said drive shaft including
      (1) a first end portion provided with a first drive gear engaging said first fixed gear element, and
      (2) a second end portion opposite said first end portion provided with a second drive gear engaging said second fixed gear element, whereby rotation of said drive shaft rotates said first and second drive gears thereby to act respectively on said first and second fixed gear elements so as to pivot said proximal arm relative to said base and to pivot said distal arm member relative to said proximal arm member; and
   (E) a drive associated with said drive shaft for selectively rotating said drive shaft relative to said proximal arm member.

2. A mechanical arm according to claim 1 wherein said base includes a first axle formed thereon to define the first pivot axis, the proximal end portion of said proximal arm member including at least one first bearing member sized and adapted to receive said first axle for pivotal movement thereon.

3. A mechanical arm according to claim 2 wherein said base includes a first knuckle having a first gap therein, said first axle defined by a first axle pin passing through said first knuckle to form oppositely projecting first trunnions, the proximal end portion of said proximal arm member including a pair of first bearing members sized and adapted to receive said first trunnions for pivotal movement thereon.

4. A mechanical arm according to claim 3 wherein said first fixed gear element is mounted to said first axle pin and is located in the first gap in said first knuckle.

5. A mechanical arm according to claim 1 wherein said distal arm member includes a second axle formed thereon to define the second pivot axis, the distal end portion of said proximal arm member including at least one second bearing member sized and adapted to receive said second axle for pivotal movement thereon.

6. A mechanical arm according to claim 5 wherein said distal arm member includes a second knuckle having a second gap therein, said second axle defined by a second axle pin passing through said second knuckle to form oppositely projecting second trunnions, the proximal end portion of said proximal arm member including a pair of second bearing members sized and adapted to receive said second trunnions for pivotal movement thereon.

7. A mechanical arm according to claim 6 wherein said second fixed gear element is mounted to said second axle pin and is located in the second gap in said second knuckle.

8. A mechanical arm according to claim 5 wherein said second axle is disposed on the first end portion of said distal arm member.

9. A mechanical arm according to claim 1 wherein said proximal arm member is constructed as a channel piece including a pair of side walls and a connecting wall extending therebetween to define an interior region, said drive shaft being located in the interior region.

10. A mechanical arm according to claim 9 wherein said connecting wall has a slot formed therein at the proximal end portion of said proximal arm member, said slot sized and adapted to allow said first fixed gear element to extend therethrough.

11. A mechanical arm according to claim 1 wherein said first and second drive gears are worm gears.

12. A mechanical arm according to claim 11 wherein said worm gears are each cone drive double enveloping worm gears.

13. A mechanical arm according to claim 1 wherein said drive includes an output shaft provided with an output gear, said drive shaft having a central portion and including a transfer gear disposed on the central portion for engaging said output gear.

14. A mechanical arm according to claim 13 wherein said drive is mounted to said proximal arm and wherein said output shaft extends transversely of said proximal arm.

15. A mechanical arm according to claim 1 wherein said drive is a motor.

16. A mechanical arm according to claim 15 wherein said motor includes a reduction gear box associated therewith.

17. A mechanical arm according to claim 1 wherein the ratios of said first and second fixed gear elements and said first and second drive gears are selected such that said distal arm member undergoes about twice an amount of angular movement about the second pivot axis when compared to the amount of angular movement of said proximal arm member about the first pivot axis.

18. A mechanical arm according to claim 1 including a foot member disposed on the second end portion of said distal arm member.

19. A mechanical arm according to claim 18 including a gimbal mount interconnecting said foot and the second end portion of said distal arm member.

20. A mechanical arm according to claim 1 wherein said distal arm member and said proximal arm member are of substantially common length.

21. A mechanical arm according to claim 1 wherein one of the first end portion of said distal arm member and the distal end portion of said proximal arm member includes a dog operative to provide a limit stop when said distal arm member and said proximal arm member are aligned with one another.

22. A mechanical arm adapted to mount to a support and operative to move from a contracted state to and extended state, comprising:
   (A) a base adapted to secure to the support and including a first fixed gear element disposed thereon and a first axle disposed thereon to define a first pivot axis;
   (B) an elongated distal arm member having a first end portion and a second end portion opposite the first end portion and including a second fixed gear element disposed thereon and a second axle disposed thereon to define a second pivot axis;
   (C) an elongated proximal arm member including at least one first bearing member on a proximal end portion thereof that is sized and adapted to receive said first axle for pivotal movement about the first pivot axis and including at least one second bearing member on a distal end portion thereof that is sized and adapted to receive said second axle for pivotal movement about the second pivot;

(D) a drive shaft rotatably disposed on said proximal arm member and extending longitudinally thereof, said drive shaft including
   (1) a first end portion provided with a first drive gear engaging said first fixed gear element, and
   (2) a second end portion opposite said first end portion provided with a second drive gear engaging said second fixed gear element, whereby rotation of said drive shaft rotates said first and second drive gears thereby to act respectively on said first and second fixed gear elements so as to pivot said proximal arm relative to said base and to pivot said distal arm member relative to said proximal arm member; and (E) a drive associated with said drive shaft for selectively rotating said drive shaft relative to said proximal arm member.

23. A mechanical arm according to claim 22 wherein said base includes a first knuckle having a first gap therein, said first axle defined by a first axle pin passing through said first knuckle to form oppositely projecting first trunnions, the proximal end portion of said proximal arm member including a pair of first bearing members sized and adapted lo receive said first trunnions for pivotal movement thereon.

24. A mechanical arm according to claim 23 wherein said first fixed gear element is mounted to said first axle pin and is located in the first gap in said first knuckle.

25. A mechanical arm according to claim 22 wherein said distal arm member includes a second knuckle having a second gap therein, said second axle defined by a second axle pin passing through said second knuckle to form oppositely projecting second trunnions, the proximal end portion of said proximal arm member including a pair of second bearing members sized and adapted to receive said second trunnions for pivotal movement thereon.

26. A mechanical arm according to claim 25 wherein said second fixed gear element is mounted to said second axle pin and is located in the second gap in said second knuckle.

27. A mechanical arm according to claim 22 wherein said second axle is disposed on the first end portion of said distal arm member.

28. A mechanical arm according to claim 22 wherein the ratios of said first and second fixed gear elements and said first and second drive gears are selected such that said distal arm member undergoes about twice an amount of angular movement about the second pivot axis when compared to the amount of angular movement of said proximal arm member about the first pivot axis.

29. A mechanical arm according to claim 22 including a foot member disposed on the second end portion of said distal arm member.

30. A mechanical arm according to claim 29 including a gimbal mount interconnecting said foot and the second end portion of said distal arm member.

31. A mechanical arm adapted to mount to a support and operative to move from a contracted state to and extended state, comprising:

(A) a base adapted to secure to the support and including a first fixed gear element disposed thereon;

(B) an elongated distal arm member having a first end portion and a second end portion opposite the first end portion and including a second fixed gear element disposed thereon;

(C) an elongated proximal arm member constructed as a channel piece including a pair of side walls and a connecting wall extending therebetween to define an interior region and having a proximal end portion pivotally secured to said base for movement about a first pivot axis and a distal end portion pivotally secured to said distal arm member for movement about a second pivot axis;

(D) a drive shaft rotatably disposed in the interior region of said proximal arm member and extending longitudinally thereof, said drive shaft including
   (1) a first end portion provided with a first drive gear engaging said first fixed gear element,
   (2) a second end portion opposite said first end portion provided with a second drive gear engaging said second fixed gear element, and
   (3) a central portion between said first and second end portions, said central portion including a transfer gear disposed thereon, whereby rotation of said drive shaft rotates said first and second drive gears thereby to act respectively on said first and second fixed gear elements so as to pivot said proximal arm relative to said base and to pivot said distal arm member relative to said proximal arm member; and (E) a drive including an output shaft extending transversely of said proximal arm between the side walls of said channel piece, said output shaft including an output gear disposed thereon and oriented to engage said transfer gear for selectively rotating said drive shaft relative to said proximal arm member.

32. A mechanical arm according to claim 31 wherein said base includes a first axle formed thereon to define the first pivot axis, the proximal end portion of said proximal arm member including at least one first bearing member sized and adapted to receive said first axle for pivotal movement thereon.

33. A mechanical arm according to claim 32 wherein said base includes a first knuckle having a first gap therein, said first axle defined by a first axle pin passing through said first knuckle to form oppositely projecting first trunnions, the proximal end portion of said proximal arm member including a pair of first bearing members sized and adapted to receive said first trunnions for pivotal movement thereon.

34. A mechanical arm according to claim 33 wherein said first fixed gear element is mounted to said first axle pin and is located in the first gap in said first knuckle.

35. A mechanical arm according to claim 31 wherein said distal arm member includes a second axle formed thereon to define the second pivot axis the distal end portion of said proximal arm member including at least one second bearing member sized and adapted to receive said second axle for pivotal movement thereon.

36. A mechanical arm according to claim 35 wherein said distal arm member includes a second knuckle having a second gap therein, said second axle defined by a second axle pin passing through said second knuckle to form oppositely projecting second trunnions, the proximal end portion of said proximal arm member including a pair of second bearing members sized and adapted to receive said second trunnions for pivotal movement thereon.

37. A mechanical arm according to claim 36 wherein said second fixed gear element is mounted to said second axle pin and is located in the second gap in said second knuckle.

38. A mechanical arm according to claim 35 wherein said second axle is disposed on the first end portion of said distal arm member.

39. A mechanical arm according to claim 31 wherein said connecting wall has a slot formed therein at the proximal end portion of said proximal arm member, said slot sized and adapted to allow said first fixed gear element to extend therethrough.

40. A mechanical arm according to claim 31 wherein the ratios of said first and second fixed gear elements and said first and second drive gears are selected such that said distal arm member undergoes about twice an amount of angular movement about the second pivot axis when compared to the amount of angular movement of said proximal arm member about the first pivot axis.

41. A mechanical arm according to claim 31 including a foot member disposed on the second end portion of said distal arm member.

42. A mechanical arm according to claim 41 including a gimbal mount interconnecting said foot and the second end portion of said distal arm member.

\* \* \* \* \*